United States Patent [19]
Kleinhans

[11] Patent Number: 5,150,611
[45] Date of Patent: Sep. 29, 1992

[54] FLOW SENSOR

[75] Inventor: Josef Kleinhans, Vaihingen/Enz, Fed. Rep. of Germany

[73] Assignee: Robert Bosch GmbH, Stuttgart, Fed. Rep. of Germany

[21] Appl. No.: 555,386

[22] PCT Filed: Dec. 21, 1988

[86] PCT No.: PCT/DE88/00776
  § 371 Date: Oct. 5, 1990
  § 102(e) Date: Oct. 5, 1990

[87] PCT Pub. No.: WO89/07243
  PCT Pub. Date: Aug. 10, 1989

[30] Foreign Application Priority Data

Feb. 6, 1988 [DE] Fed. Rep. of Germany ....... 3803611

[51] Int. Cl.$^5$ ................................................ G01F 1/68
[52] U.S. Cl. ............................ 73/204.14; 73/204.16
[58] Field of Search ............ 73/118.2, 204.14, 204.15, 73/204.16, 204.18

[56] References Cited

U.S. PATENT DOCUMENTS 4,807,470 2/1989 Kleinhans .................. 73/204.15
4,934,188 6/1990 Tanimoto et al. ............... 73/204.18

FOREIGN PATENT DOCUMENTS 8707016 1/1987 World Int. Prop. O. .

Primary Examiner—Herbert Goldstein
Attorney, Agent, or Firm—Kenyon & Kenyon

[57] ABSTRACT

An apparatus for measuring the mass flow rate of air has a resistance bridge circuit, whose diagonal voltage is applied to a switching control element, which is in turn supplied with voltage pulses for heating a flow sensor probe. The switching control element regulates the heat output conveyed to the probe, and emits an output signal proportional to the mass flow rate of air over the probe. The voltage pulses ($U_T$) for heating the probe are supplied to a first closed loop control circuit. The first closed loop control circuit emits a first output signal ($U_{a1}$), which is a function of the voltage measured across the diagonals of the resistance bridge circuit. A second closed loop control circuit is adapted to receive the first output signal ($U_{a1}$) and an input signal ($V_2U_R$). The input signal ($v_2U_R$) depends on the voltage pulses ($U_T$) for heating the sensor's probe, a reference variable ($U_R$), and the first output signal ($U_{a1}$). The output of the second closed loop control circuit is the desired analog output signal of the apparatus and is indicative of the mass flow rate of air over the probe.

19 Claims, 2 Drawing Sheets

5,150,611

FLOW SENSOR

FIELD OF THE INVENTION

The present invention relates to apparatus for measuring the mass flow rate of air and, in particular, to such apparatus which emit output signals indicative of the mass flow rate of air flowing over a probe.

BACKGROUND INFORMATION

Apparatus for measuring the mass flow rate of air are used for various applications, such as in fuel injection systems. Known apparatus typically include a probe and a bridge circuit, wherein the diagonal voltage of the bridge circuit is applied to a switching control element. The switching control element is in turn supplied with voltage pulses for heating the probe. The switching control element thus regulates the heat output conveyed to the probe. The apparatus emits an output signal proportional to the mass flow rate of air over the probe. A typical apparatus for measuring the mass flow rate of air is shown in DE-PS 24 48 304.

In known circuits for controlling apparatus for measuring the mass flow rate of air, or flow sensors, the heating current typically has a direct current component and an alternating current component. The alternating current component is superimposed on the direct current component and consists of a series of current pulses, each of constant duration, for heating the sensor's probe. The pulse repetition rate, which is the pulse frequency, changes depending upon the mass flow rate of air over the probe.

In a typical known circuit for controlling a flow sensor, an operational amplifier, whose output voltage is changed to a frequency proportional to the mass flow rate of air over the probe, is connected to resistance bridge diagonals. The frequency of the voltage controls the alternating current supplied to the bridge circuit and serves as a controlled variable for use in a fuel injection system. For this purpose, the output voltage of the operational amplifier is changed to a frequency by means of a voltage to frequency converter, and the operational amplifier's output voltage is subjected to a linearization function.

For many purposes, it is desirable to obtain an analog output voltage as the output signal of a switching controlled flow sensor. One problem with known circuits for controlling flow sensors, however, is that the output signal is dependent on the battery supply voltage. Thus, because the analog output voltage is dependent on the battery supply voltage, changes in the battery supply voltage can affect the level of the flow sensor's analog output signal.

It is the object of the present invention, therefore, to overcome the problems of known apparatus for measuring the mass flow rate of air.

SUMMARY OF THE INVENTION

The present invention is directed to an apparatus for measuring the mass flow rate of air. The apparatus includes a resistance bridge circuit, wherein the diagonal voltage of the resistance bridge circuit is applied to a switching control element. The apparatus includes a probe, and the switching control element is supplied with voltage pulses for heating the probe. The switching control element regulates the heat output conveyed to the probe.

The voltage pulses that heat the probe and the measured signal from the resistance bridge circuit diagonals are applied to a first closed loop control circuit. The first control circuit generates a first output signal which is a function of the voltage signal measured from the resistance bridge diagonals, and is proportional to the mass flow rate of air around the probe. A second closed loop control circuit is coupled to the first control circuit and is adapted to receive the first output signal therefrom. The second closed loop control circuit is also adapted to receive an input signal based on the voltage pulses heating the probe, a reference variable, the first output signal, and a desired analog output signal.

One advantage of the apparatus of the present invention is that there is a lack of dynamic response problems when it is switched on. Another advantage of the apparatus of the present invention is that the output remains accurate even when there is a low battery supply voltage. Moreover, the apparatus of the present invention is adapted to use electronic semiconductor components, which typically have relatively low power dissipation characteristics. Also, the first and second closed loop control circuits provide particularly precise automatic control. While the first closed loop control circuit is dependent on the battery supply voltage, this dependency is detected and corrected by the second closed loop control circuit.

The first closed loop control circuit includes a sample and hold circuit to convert the voltage pulses, which heat the probe, into a steady state form. The steady state voltage is in turn supplied to the input of a sawtooth voltage generator. The output signal of the sawtooth voltage generator is supplied to the noninverting input of a first comparator, while the first output signal is supplied to the inverting input of the first comparator. The output of the first comparator is coupled to a circuit breaker, preferably an electronic switch, to automatically control the voltage pulses for heating the probe.

The second closed loop control circuit includes a second amplifier having an inverting and noninverting input, and which generates a second output signal which is the desired analog output of the apparatus. The second output signal is a function of the first output signal, which is applied to the second amplifier's noninverting input, and an input signal which is applied to the amplifier's inverting input.

A second comparator supplies an input signal to an averaging device. The output of the averaging device in turn supplies the input to the second amplifier, which provides the second output signal, or desired analog output of the apparatus. The inverting input of the second comparator is coupled to the output of the sawtooth voltage generator. The noninverting input of the second comparator is coupled to the output of the second amplifier. A second voltage source is coupled to the output of the second comparator. The output of the second comparator is applied to the averaging device which, in turn, generates an average steady state voltage. The averaging device is preferably a low pass filter. The desired analog output of the second amplifier is a signal which is proportional to the mass flow rate of air over the probe. The second amplifier is preferably an operational amplifier, which provides a high level of accuracy. Because the input signal supplied to the second amplifier is generated using the second reference voltage source, and the desired analog output is dependent on this input signal, the second reference voltage source should be highly precise.

Known apparatus for measuring the mass flow rate of air typically use pulses of varying frequency to heat the probe, and the frequency is indicative of the air mass flow rate. The apparatus of the present invention, on the other hand, uses pulses with a fixed frequency. Therefore, unlike known apparatus, the apparatus of the present invention varies the duration of the voltage pulses used to heat the probe. The duration of the pulses is indicative of the mass flow rate of air over the probe.

In one apparatus of the present invention, a resistor is coupled to the output of the second amplifier and is used as the second reference voltage source. A considerable simplification and cost savings results because the reference voltage signal is derived from the second output signal, which is proportional to the mass flow rate of air. This eliminates the need for a highly precise reference voltage source.

Other advantages, features and details of the apparatus of the present invention will become apparent in view of the following detailed description and drawings taken in connection therewith.

DETAILED DESCRIPTION

Figure 1:
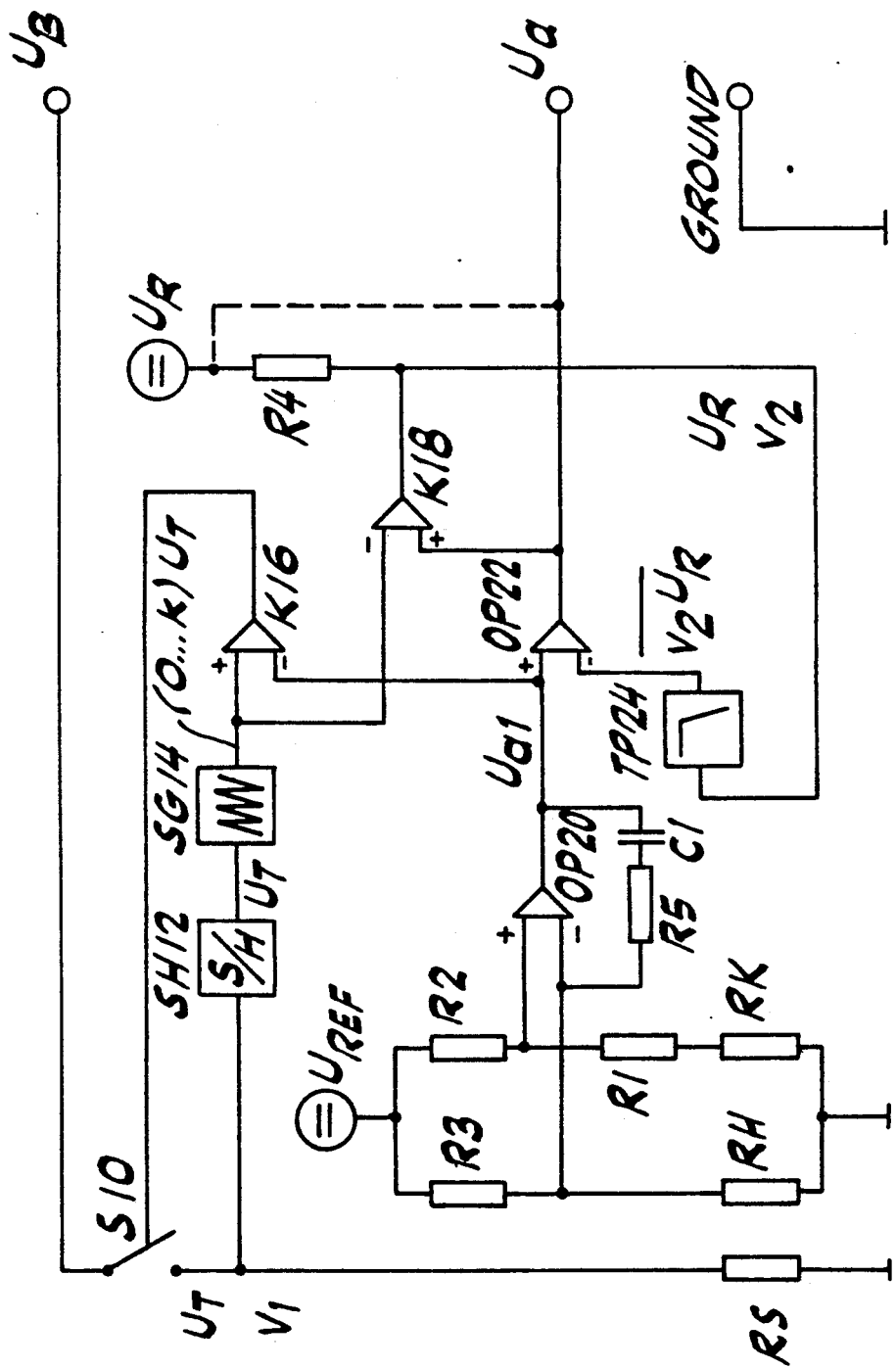
FIG. 1 is a schematic diagram of an apparatus embodying the present invention.

In FIG. 1, an apparatus embodying the present invention for measuring the mass flow rate of air is illustrated. The apparatus of the present invention operates on voltage pulses having a fixed frequency, and includes an electronic switch S10 coupled to one side of a battery supply voltage $U_B$. The output of the switch S10 is coupled to a connecting terminal of a heating resistor element RS, which is coupled to ground through its other connecting terminal.

Figure 2:
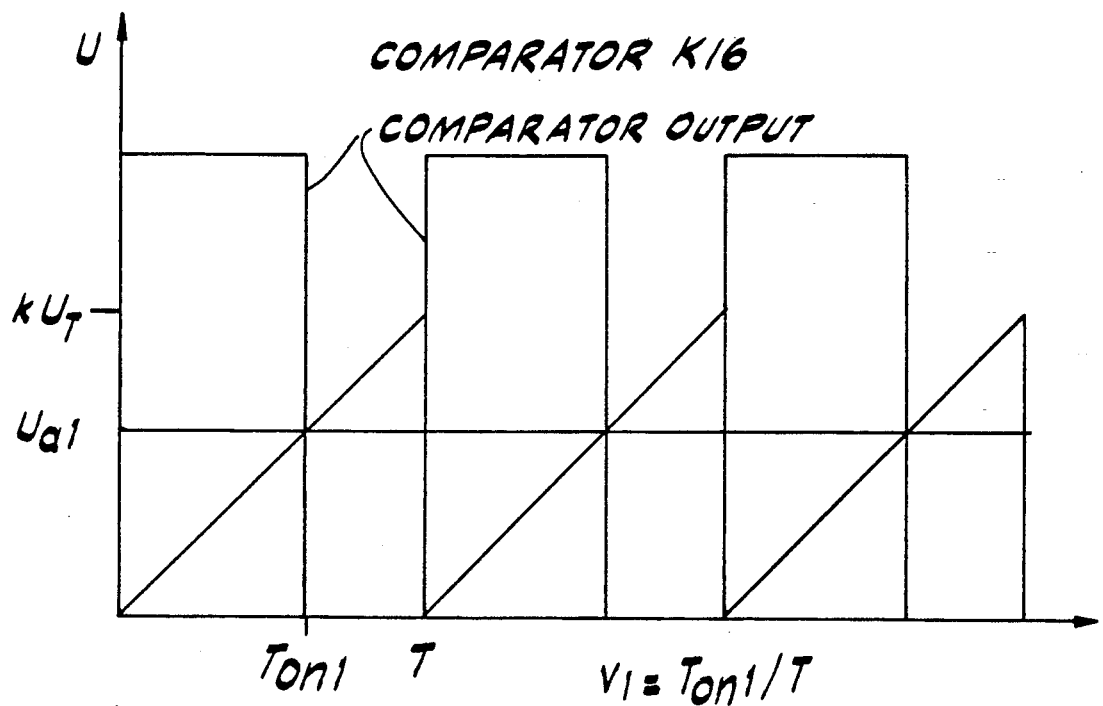
FIG. 2 shows two diagrams illustrating the voltage characteristics of the two comparators of the apparatus of FIG. 1.
Figure 2:
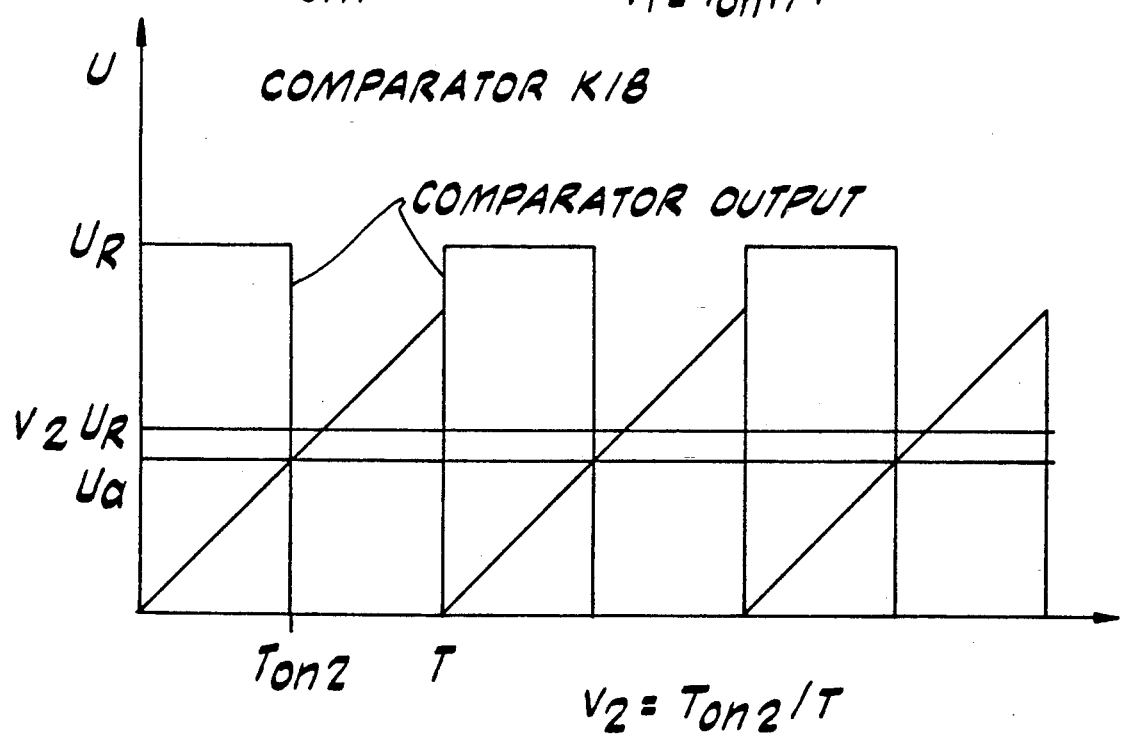

Through the appropriate control of the electronic switch S10, which has a pulse duty factor $v_1$, the heating resistor element RS is supplied with voltage pulses $U_T$ which have a fixed frequency. The pulse duty factor $v_1$ is equal to the period the switch S10 is closed divided by the period of the pulse $U_T$, as shown in FIG. 2. The heating resistor element RS is in thermal contact with a probe, which includes a resistor RH. The resistor RH is coupled to resistors R1,R2,R3, and RK in a resistance bridge circuit, as shown in FIG. 1. The lower end of the resistance bridge circuit is coupled to ground, and the upper end is coupled to a first reference voltage source $U_{REF}$.

An unbalance in the resistance bridge comprising the resistors R1,R2,R3,RK and RH is measured by means of a first operational amplifier OP20, which has two inputs coupled to opposite terminals of the resistance bridge diagonals. An RC element, comprising a resistor R5 and a capacitor C1, is coupled to the first operational amplifier OP20 between its inverting input and its output. At its output, the first operational amplifier OP20 emits a first output voltage $U_{al}$ which is proportional to the diagonal voltage of the resistance bridge and, thus, to the mass flow rate of air around the probe.

The frequency of the voltage pulses $U_T$ emitted by the electronic switch S10 is fixed, and the pulses are applied to a sample and hold circuit SH12. The output of the sample and hold circuit SH12 is coupled to the input of a sawtooth voltage generator SG14. The sample and hold circuit SH12 generates a steady state output voltage $U_T$ which serves as an input to the sawtooth generator SG14. The amplitude of the output signal of the sawtooth voltage generator SG14 corresponds to the steady state voltage $U_T$, multiplied by a factor having a value within the range of O to k, where k is predetermined.

The apparatus further comprises a first comparator K16 and a second comparator K18. The output of the sawtooth voltage generator SG14 is coupled to the noninverting input of the first comparator K16 and to the inverting input of the second comparator K18. Thus, the noninverting input of the first comparator K16 and the inverting input of the second comparator K18 are each adapted to receive the output signal of the sawtooth voltage generator SG14.

The first output voltage $U_{al}$ emitted by the first operational amplifier OP20 is applied to the inverting input of the first comparator K16. The output of the first comparator K16 is coupled to the electronic switch S10 to actuate the switch. Thus, the first comparator K16 controls the pulse duty factor $v_1$ of the voltage pulses $U_T$ which, in turn, heat the resistor element RS.

The first output voltage $U_{al}$ of the first operational amplifier OP20 is applied to the input of a second operational amplifier OP22. The noninverting input of the second operational amplifier OP22 is coupled to both the inverting input of the first comparator K16 and the output of the first operational amplifier OP20. The second operational amplifier OP22 generates a second output voltage $U_a$, which is the desired analog output of the apparatus. The output of the second amplifier OP22 is also coupled to the noninverting input of the second comparator K18.

A highly precise second reference voltage source $U_R$ is coupled to a resistor R4. The resistor R4 is, in turn, coupled to the output of the second comparator K18. The second reference voltage $U_R$ has a pulse duty factor $v_2$, which is determined by the second comparator K18. The second comparator K18 generates a square wave output voltage $v_2 U_R$, and its output is coupled to the input of an averaging device TP24, which is preferably a low pass filter. The low pass filter TP24 emits a d.c. output voltage $\overline{v_2 U_R}$, which is the average value of the square wave voltage $v_2 U_R$ taken from the output of the second comparator K18. The output terminal of the low pass filter TP24 is coupled to the inverting input of the second operational amplifier OP22. Thus, the output d.c. voltage $\overline{v_2 U_R}$ of the low pass filter TP24 is applied to the inverting input of the second operational amplifier OP22. As described above, the output of second operational amplifier OP22 is the desired analog output signal $U_a$ of the apparatus, which is proportional to the mass flow rate of air around the probe.

The operation of the apparatus of the present invention of FIG. 1 is hereinafter described with reference to FIG. 2. The heating resistor element RS is heated by the voltage pulses $U_T$ which have a fixed frequency and a pulse duty factor $v_1$. When the electronic switch S10 is closed, the amplitude of the voltage pulses $U_T$ is identical to that of the supply voltage $U_B$, and the voltage pulses $U_T$ are transmitted to the sample and hold circuit SH12. The steady state voltage $U_T$ is in turn generated as an output by the sample and hold circuit SH12. The steady state voltage $U_T$ is evaluated in the sawtooth voltage generator SG14. At the output of the sawtooth voltage generator SG14, the amplitude of the signal is within the range of (O to k)* $U_T$ volts, where $U_T$ represents the amplitude of the steady state voltage $U_T$. This voltage is compared by the first comparator K16 to the first output voltage $U_{al}$ of the first operational amplifier OP20. As described above, the first output voltage $U_{al}$ is a function of the voltage across the resistance bridge, and the output of the first comparator K16 controls the pulse duty factor $v_1$.

When the resistance bridge is balanced, $RH = (R1 + RK)/R2 * R3$ and is constant, and $RH = Ro * (1 + TKH * T_{\ddot{u}})$. TKH is the temperature coefficient of the resistor RH, and $T_{\ddot{u}}$ is its excess temperature. Therefore, $T_u$ is also constant. And because the resistor RH is in narrow thermal contact with (but not necessarily touching) the resistor element RS, the excess temperature of the resistor element RS is the same as the excess temperature of the resistor RH. For the resistor RH, the controlling equation is:

$$Ps = g(\dot{m}) * T_{\ddot{u}} \qquad (1)$$

wherein Ps is the supplied power, and $g(\dot{m})$ is a variable dependent upon the mass flow rate of air ($\dot{m}$).

Since $\overline{PS} = v_1 * \hat{PS} = v_1 * (U_T)^2 / RS$, it follows that:

$$v_1 * (U_T)^2 / RS = g(\dot{m}) * T_{\ddot{u}} \qquad (2)$$

At the first comparator K16, it follows that:

$$U_{al}/(k * U_T) = T_{on1}/T = v_1 \qquad (3)$$

wherein $T_{on1}$ is the period that the electronic switch S10 is closed, and the voltage pulses $U_T$ are equal to $U_B$. By inserting equation (3) into equation (2), the following result is obtained:

$$U_{al} = (k * U_T) * (U_T)^2/RS = g(\dot{m}) * T_{\ddot{u}} \qquad (4)$$

and, therefore $$U_{al} = (k * g(\dot{m}) * T_{\ddot{u}} * RS)/U_T$$

The first output voltage $U_{al}$ of the first operational amplifier OP20 is therefore dependent upon both the voltage pulses $U_T$ and the battery voltage $U_B$. This dependency is eliminated in the second closed loop control circuit as hereinafter described.

At the second comparator K18, the following equation, which is analogous to equation (3), applies:

$$v_2 = U_a/k * U_T) \qquad (5)$$

In the low pass filter TP24, the average output voltage $\overline{v_2 U_R}$ is determined based on the square wave voltage, having amplitude values between 0 volts and the reference voltage $U_R$, from the output of the second comparator K18. Therefore, the following d.c. voltage is applied to the inverting input of the second operational amplifier OP22:

$$v_2 * U_R = U_a/(k * U_T) * U_R \qquad (6)$$

This d.c. voltage is compared by the second operational amplifier OP22 to the first output voltage $U_{al}$ of first operational amplifier OP20. If there is a difference between the two voltages, the second operational amplifier OP22 regulates its output voltage $U_a$ as a function of this voltage difference. Therefore, at the output of the second operational amplifier OP22, it follows that:

$$U_a/(k * U_T) * U_R = U_{al} = (k * g(\dot{m}) * T_{\ddot{u}} * RS)/U_T \qquad (7)$$

Equation (7) is solved for $U_a$ as follows:

$$U_a = (k^2 * T_{\ddot{u}} * RS)/U_R \qquad (8)$$

Since k, $T_{\ddot{u}}$, RS and $U_R$ are constants, the desired analog output voltage $U_a$ is dependent only upon the mass flow rate of air flowing over the probe and, in particular, the resistor RH.

These relationships are clarified by the signal diagrams illustrated in FIG. 2, wherein the voltage relations existing at the first comparator K16 are represented in the top half of FIG. 2, and those at the second comparator K18 are represented in the lower half of FIG. 2.

A particularly advantageous feature of the apparatus of the present invention is illustrated by the dotted line in FIG. 1. Rather than use the second voltage source $U_R$, the output terminal connection of the apparatus is coupled to the upper terminal connection of the resistor R4, as indicated by the dotted line. Thus, the need for the second voltage source $U_R$ is eliminated. By substantiating the value $U_a$ for the reference voltage $U_R$ in equation (8), this feature of the present invention can be illustrated as follows:

$$U_a = k * \sqrt{T_u * RS * g(\dot{m})} \qquad (9)$$

As a result of this circuit configuration, there is substantial simplification and cost savings in the apparatus of the present invention. The first reference voltage source $U_{REF}$, which is the voltage source for the resistance bridge comprising the resistors R1,R2,R3,RK and RH, does not have to be a highly precise voltage source of the type that would be necessary to supply the second reference voltage $U_R$. Thus, the apparatus of present invention has the important advantage of not requiring highly precise voltage sources.

It should be pointed out that the apparatus of the present invention is particularly suited for substitution in existing analog controller circuits. This is true since, except for an adjustable proportionality factor k, the output voltage $U_a$ of the apparatus of the present invention corresponds to the output voltage $U_{analog}$ of known analog apparatus. This is shown by the following comparison with equation (1):

$$U_{analog}^2/RS = g(m) * T_u \qquad (10)$$

$$U_{analog} = \sqrt{g(m) * T_u * RS} \qquad (11)$$

$$U_a = K * U_{analog} \text{ resp. } U_a = k^2 * U_{analog}^2/U_R \qquad (12)$$

I claim:

1. A circuit for measuring a mass flow rate of air flowing over a probe, comprising:
   a first closed loop control circuit which comprises
      a resistance bridge circuit having a diagonal voltage and including the probe, and
      a switching device for receiving a supply voltage, the switching device being controlled by the diagonal voltage across the resistance bridge circuit to generate voltage pulses based on the supply voltage, the voltage pulses heating the probe;

the first closed loop control circuit generating a first output signal based on the diagonal voltage across the resistance bridge circuit; and a second closed loop control circuit coupled to the first closed loop control circuit, the second closed loop control circuit receiving the first output signal and a reference voltage, and generating a second output signal based thereon, the second output signal being proportional to the mass flow rate of air flowing over the probe.

2. The circuit according to claim 1, wherein the first closed loop control circuit further comprises a sample and hold circuit coupled to the switching device and a sawtooth voltage generator coupled to the sample and hold circuit.

3. The circuit according to claim 2, wherein an output signal of the sawtooth voltage generator is applied to a noninverting input of a first comparator circuit, the first output signal is supplied to the inverting input of the first comparator circuit, and an output of the first comparator circuit is connected to the switching device to automatically control the voltage pulses which heat the probe.

4. The circuit according to claim 3, wherein the second closed loop control circuit includes an amplifying element, wherein the first output signal is applied to its noninverting input and its output emits the second output signal.

5. The circuit according to claim 4, wherein the amplifying element includes an operational amplifier.

6. The circuit according to claim 5, wherein the second closed loop control circuit further includes:

a second comparator circuit, whose inverting input is connected to the output of the sawtooth voltage generator and whose noninverting input is connected to the output of the amplifying element;

a reference voltage source for generating the reference voltage, the reference voltage source being connected to the output of the second comparator circuit; and an averaging element connected to the output of the second comparator circuit to supply an average value of the output of the second comparator circuit.

7. The circuit according to claim 6, wherein the averaging element comprises a low pass filter.

8. The circuit according to claim 7, wherein the reference voltage source generates a highly precise reference voltage.

9. The circuit according to claim 7, wherein the reference voltage source comprises a resistor connected to the output of the amplifying element.

10. An apparatus for measuring the mass flow rate of air flowing over a probe, comprising:

a first closed loop control circuit which comprises a resistance bridge circuit having a diagonal voltage and including the probe, the first closed loop control circuit controlling voltage pulses for heating the probe and generating a first output signal based on the diagonal voltage across the resistance bridge circuit; and a second closed loop control circuit coupled to the first closed loop control circuit, the second closed loop control circuit receiving the first output signal and a reference voltage, and generating a second output signal based thereon, the second output signal being proportional to the mass flow rate of air flowing over the probe.

11. An apparatus according to claim 10 wherein the first closed loop control circuit further comprises a sample and hold circuit and a sawtooth voltage generator coupled to the sample and hold circuit.

12. An apparatus according to claim 11 wherein the first closed loop control circuit further comprises a first comparator, the inputs of the first comparator being coupled to receive the output of the sawtooth voltage generator and the first output signal, the output of the comparator being coupled to a circuit breaker for controlling the voltage pulses for heating the probe.

13. An apparatus according to claim 12 wherein the second closed loop control circuit comprises an amplifying element, an input of the amplifying element being coupled to the first closed loop control circuit to receive the first output signal for generating the second output signal based thereon.

14. An apparatus according to claim 13 wherein the amplifying element comprises an operational amplifier.

15. An apparatus according to claim 14 wherein the second closed loop control circuit further comprises a second comparator, the inputs of the second comparator being coupled to the output of the operational amplifier and to the output of the sawtooth voltage generator, the output of the second comparator being coupled to a reference voltage source and to an averaging element, the output of the averaging element being an average value of the output of the second comparator, and being coupled to an input of the operational amplifier.

16. An apparatus according to claim 15 wherein the averaging element comprises a low pass filter.

17. An apparatus according to claim 16 wherein the reference voltage source includes a resistor coupled to the output of the second comparator.

18. An apparatus according to claim 10, further comprising a battery supply voltage, the second output signal being independent of the battery supply voltage.

19. An apparatus according to claim 10 wherein the first closed loop control circuit varies the duration of the voltage pulses for heating the probe.

* * * * *